Nov. 9, 1926.

B. ANDERSON

BALE TIE

Filed Nov. 16, 1925

1,606,331

Bert Anderson, Inventor

Witnesses
C. E. Churchman Jr.

By Richard B. Oliver

Attorney

Patented Nov. 9, 1926.

1,606,331

UNITED STATES PATENT OFFICE.

BERT ANDERSON, OF HOUSTON, TEXAS.

BALE TIE.

Application filed November 16, 1925. Serial No. 69,477.

This invention relates to bale ties and has for its object the production of a simple and efficient bale tie which may be formed of a sheet metal strip and which is provided with interlocking means at the respective ends thereof for facilitating the tieing of a bale such as a bale of cotton, in such a manner as to prevent the same from becoming accidentally united or unfastened.

Another object of this invention is the production of a simple and efficient locking means for the bale tie which, when assembled in a locked position will efficiently hold a bale in its compact relation and which, at the same time may be readily released when it is so desired.

With these and other objects in view, this invention consists of certain novel constructions, combinations and arrangements of parts as will be hereinafter fully described and claimed.

Figure 2:
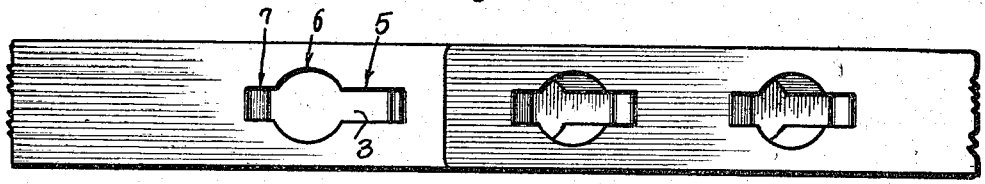
Figure 2 is a bottom plan view of the bale tie in a locked position.

By referring to the drawings, it will be seen that 1 designates the overlapping end of the bale tie and 2 indicates the under lapping end of the bale tie. The overlapping end of the bale tie is provided with a plurality of locking sockets 3, and each locking socket 3 is formed from the body of the middle by punching outwardly a specially constructed struck-up portion or cover 4. This struck-up portion or cover 4 is formed of the same shape as the socket 3. The socket 3 comprises an elongated forwardly extending slot 5 which terminates in a substantially enlarged circular opening 6, the substantially circular opening 6 terminating at its opposite side in a comparatively short aperture or slot 7 arranged in alinement with the slot 5 as illustrated clearly in Figure 2.

Figure 3:
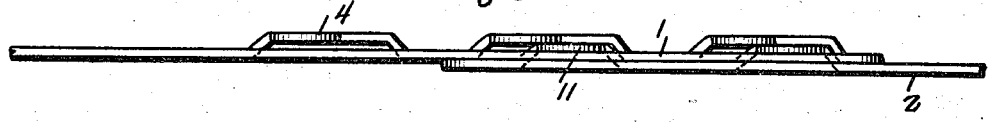
Figure 3 is a side elevation of the respective ends of the bale tie shown in a locked position.
Figure 4:
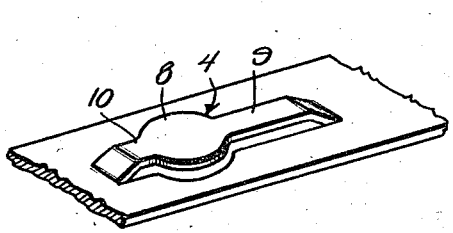
Figure 4 is a perspective view of a portion of the outer end of the bale tie.
Figure 5:
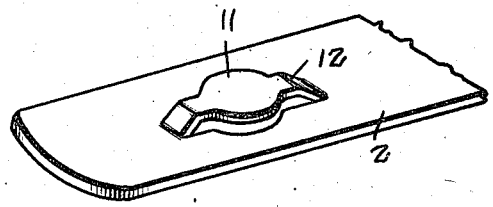
Figure 5 is a perspective view of one of a portion of the inner or under ends of the bale tie.

As above stated, the struck-up portion or cover 4 which is formed from the body of the bale tie is struck from the aperture 3 and is formed of the same contour having an enlarged circular portion 8 terminating in a forwardly extending tongue 9 and a rearwardly extending tongue 10, the cover 4 being struck out from the body and arranged in spaced relation relative to the body, as clearly shown in Figures 3 and 4 of sufficient distance to receive the struck-up portion or locking lug 11 carried by the underlapping portion 2 of the tie. This lug 11 is substantially circular at its central portion and is provided with laterally extending and downwardly inclined tongues 12 which merge into the body of the end 2, the lug 11 being struck from the body and extended outwardly therefrom for the distance equal to the thickness of the overlapping end 1 of the tie.

Figure 1:
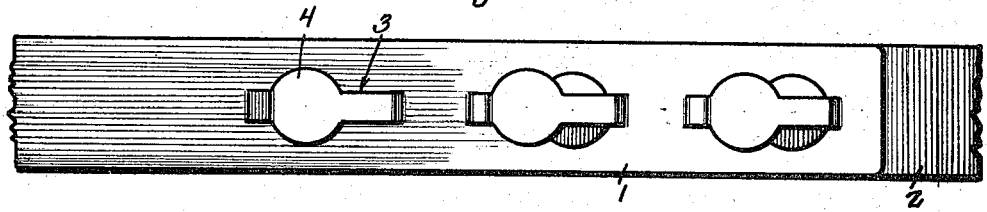
Figure 1 is a top plan view of the bale tie in a locked position.

As shown clearly in Figures 1, 2 and 3, any suitable or desired number of these sockets and lugs or struck-out portions may be employed to suit the convenience of the manufacturer or operator and to permit the various adjustments of the locking device of the bale tie, thereby permitting a bale to be conveniently tied and locked in the desired adjusted position or in accordance with the pressure which is desired, upon the bale.

In locking the tie, the lug 11 is extended through the substantially circular aperture 6 formed in the under face of the overlapping portion 1 of the tie and this lug portion 11 is adapted to slide over the top of the overlapping portion of the tie so as to overhang the side edges of the slot 5. In this way the lug 11 will automatically lock in engagement with the slot 5 formed in the overlapping portion and firmly hold the bale tie in a set or locked position.

From the foregoing description it will be seen that a very simple and efficient bale tie lock has been produced which will permit the bale tie to be conveniently and efficiently locked to a suitable or desired adjusted position.

It should be further understood that certain detailed changes in mechanical construction may be employed without departing from the spirit of the invention so long as these changes fall within the scope of the appended claims.

Having described the invention, what is claimed is:

1. A bale tie of the class described, comprising an overlapping end and an underlapping end, said overlapping end provided with a struck-out portion comprising a substantially centrally located cover having a longitudinally extending elongated tongue and a comparatively short rearwardly extending tongue arranged in alinement with the first mentioned tongue, all being projected beyond the outer face of the overlapping end of the bale tie for a distance equivalent to the thickness of the bale tie, said underlapping end provided with an outwardly struck lug comprising a central portion adapted to extend through the aperture formed in the overlapping portion of the tie, and overlap the longitudinally extending elongated slot formed in the tie due to the striking of the cover from the tie, and said struck-out lug carried by the underlapping portion being of a thickness equivalent to the thickness of said bale tie.

2. A bale tie of the class described comprising an overlapping portion and an underlapping portion, said overlapping portion provided with a struck-out portion, thereby producing an aperture having a forwardly extending slot extending longitudinally of the overlapping portion, the underlapping portion provided with a struck-out lug having a central locking portion adapted to extend through the said aperture of the overhanging portion, said lug being adapted to slide over the longitudinally extending slot formed in the overlapping portion for firmly locking the overlapping and underlapping portions of the bale tie together, and said struck-out portion on said overlapping portion constituting a shield and protector for said lugs on the underlapping portion.

In testimony whereof I affix my signature.

BERT ANDERSON.